United States Patent
Mueller et al.

(10) Patent No.: US 7,063,394 B2
(45) Date of Patent: Jun. 20, 2006

(54) METHOD AND APPARATUS FOR SETTING A DESIRED DECELERATION OF A VEHICLE

(75) Inventors: Jan-Erik Mueller, Ismaning (DE); Thomas Toelge, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 129 days.

(21) Appl. No.: 10/343,021

(22) PCT Filed: Jul. 20, 2001

(86) PCT No.: PCT/EP01/08393

§ 371 (c)(1),
(2), (4) Date: Jan. 27, 2003

(87) PCT Pub. No.: WO02/08035

PCT Pub. Date: Jan. 31, 2002

(65) Prior Publication Data

US 2003/0184151 A1    Oct. 2, 2003

(30) Foreign Application Priority Data

Jul. 26, 2000    (DE) ................................. 100 36 337

(51) Int. Cl.
    *B60T 8/32*    (2006.01)
(52) U.S. Cl. ........................ 303/138; 701/70; 303/121; 303/114.1
(58) Field of Classification Search ............... 303/138, 303/178, 182, 114.1, 114.3, 121; 701/52, 701/70, 71; 180/178
See application file for complete search history.

(56) References Cited

U.S. PATENT DOCUMENTS

| 5,335,743 | A | * | 8/1994 | Gillbrand et al. ............ 180/178 |
| 5,845,726 | A | * | 12/1998 | Kikkawa et al. ............ 180/178 |
| 5,853,230 | A | * | 12/1998 | Wagner et al. ........... 303/113.4 |
| 5,924,508 | A | | 7/1999 | Clauss et al. |
| 6,508,523 | B1 | * | 1/2003 | Yoshino ..................... 303/152 |
| 6,513,882 | B1 | * | 2/2003 | Schneider et al. .......... 303/112 |
| 6,621,176 | B1 | * | 9/2003 | Nagasaka et al. ............. 701/52 |

FOREIGN PATENT DOCUMENTS

| DE | 32 38 196 A1 | 10/1982 |
| DE | 93 20 790.5 | 6/1993 |
| DE | 197 13 715 A1 | 4/1997 |
| DE | 198 46 820 A1 | 10/1998 |
| EP | 0 894 684 A2 | 2/1999 |
| EP | 0 983 894 A2 | 3/2000 |
| GB | 2 330 185 A | 4/1999 |

* cited by examiner

*Primary Examiner*—Melanie Torres
(74) *Attorney, Agent, or Firm*—Crowell & Moring LLP

(57) ABSTRACT

A braking system for a vehicle in which, when a brake pedal is depressed, a corresponding braking effect is generated. The system includes an operating device which is in operative connection with an accelerator pedal, for setting a desired deceleration. When the accelerator pedal is released, the braking system brakes the vehicle corresponding to the set desired deceleration.

15 Claims, 2 Drawing Sheets

METHOD AND APPARATUS FOR SETTING A DESIRED DECELERATION OF A VEHICLE

BACKGROUND AND SUMMARY OF THE INVENTION

This application claims the priority of German Patent Application 100 36 337.7, filed 26 Jul. 2000 (PCT International Application No. PCT/EP01/08393, filed 20 Jul. 2001), the disclosure of which is expressly incorporated by reference herein.

The invention relates to a method and apparatus for setting a desired deceleration of a vehicle when the accelerator pedal and the brake pedal are not operated.

In vehicles, particularly passenger cars and trucks, the accelerator pedal and the brake pedal are used for accelerating the vehicle and holding the driving speed, and for decelerating the vehicle, respectively. In certain traffic situations, the driver is forced to change constantly between operating the accelerator pedal and operating the brake pedal, particularly in lines of traffic, such as on turnpikes where a so-called accordion effect may occur. It is uncomfortable and tiring for the driver to be required constantly to move the right foot between the accelerator pedal and the brake pedal; drivers of automatic-transmission vehicles may therefore be tempted to "drive with both feet". That is, the right foot is placed on the accelerator pedal while the left foot is on the brake pedal, which may lead to a constant operation of the brake and a resulting increased wearing of the brake, as well as an increased gasoline consumption because the engine and the brake continuously counteract one another.

It is an object of the present invention to provide a method and apparatus which improve comfort and the safety when driving a vehicle.

This and other objects and advantages are achieved by the invention, in which the driving speed of a vehicle is controlled by operating or releasing the accelerator. A desired deceleration can be set by means of an operating device, and the vehicle is braked by the desired deceleration when the accelerator pedal is released. This adjustable desired deceleration is preferably greater than the inherent deceleration which otherwise occurs when the accelerator is released so that the engine does not supply any driving power. This applies to vehicles with a manual transmission as well as to vehicles with an automatic transmission, which have only a low drag momentum when the accelerator is released (that is, a low inherent deceleration).

The invention can be used in combination with existing braking systems, and also in combination with devices for controlling the driving speed, such as cruise controls and the ACC. In particular, the invention can be used in combination with power braking systems which can build up wheel-individual brake pressure, independently of the control by the driver, at all wheels, for example, the DSC. The invention can also be used in braking systems with automatic brake intervention by means of a hydraulic unit or a controllable brake power assist unit, as, for example, in the ACC operation.

Other objects, advantages and novel features of the present invention will become apparent from the following detailed description of the invention when considered in conjunction with the accompanying drawings.

DETAILED DESCRIPTION OF THE DRAWINGS

Figure 1:
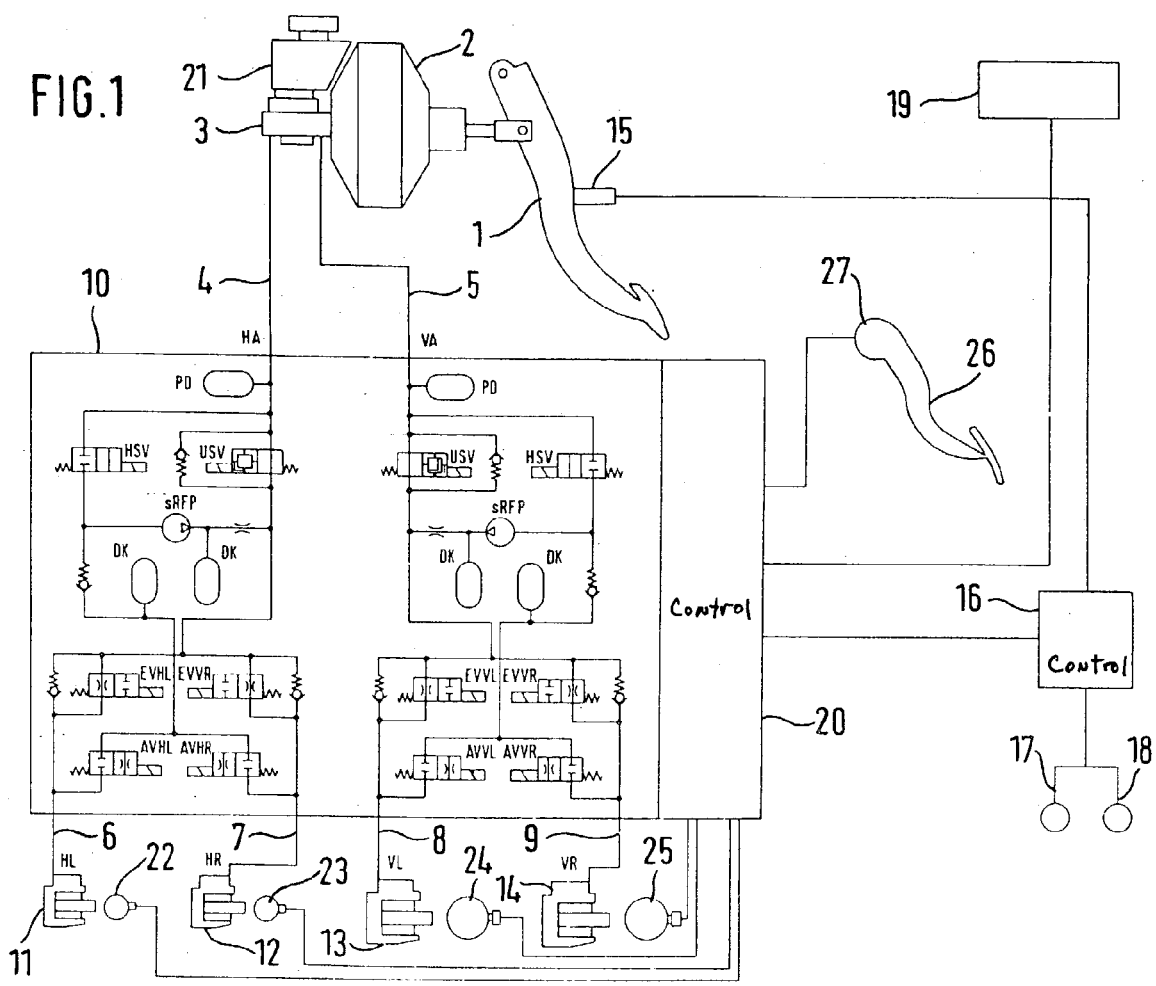
FIG. 1 is a schematic representation of a preferred embodiment of the invention.

While FIG. 1 shows a preferred embodiment of the invention, it should be noted that it can be used in an identical manner in other braking systems. In FIG. 1, a hydraulic braking system has a brake pedal 1, a brake power assist unit 2, a tandem master brake cylinder 3, a hydraulic unit 10, and wheel brakes 11, 12, 13, 14 for the four wheels of a vehicle. The hydraulic unit 10 has a control unit 20, which is connected to an operating device 19 for setting a desired deceleration. In the illustrated example, the control unit 20 is also connected with a control unit 16, which receives an electrical signal from a brake light switch 15 arranged at the brake pedal 1 and is used for controlling brake lights 17, 18. In addition, the control unit 20 is connected with rotational wheel speed sensors 22, 23, 24, 25 which detect the rotational speed of the individual wheels.

During driver-operated braking, force is exerted on the tandem master brake cylinder 3 by means of the brake pedal 1 using the assisting function of the brake power assist unit 2. As a result, a pressure is generated in the tandem master brake cylinder 3, which is propagated by way of brake lines 4, 5, 6, 7, 8, 9, through the hydraulic unit 10 to the wheel brakes 11, 12, 13, 14. By means of this brake pressure, the driver sets his desired vehicle deceleration. The movement of the brake pedal generates an electric signal in the brake light switch 15 which either directly or by way of an intermediately connected control unit 16 controls the brake lights 17, 18.

In certain traffic situations, the driver is forced to constantly change between the operation of the accelerator pedal and the brake pedal. In such cases, the driver can be relieved by the operating device 19 which makes it possible for him, after releasing the accelerator pedal, to set a braking effect that exceeds the inherent deceleration of the vehicle without operating the brake pedal. Analogously to the functioning of an automatic braking intervention for the ACC, braking intervention can take place by means of a suitable hydraulic unit 10. The electric signal supplied by the operating device 19 is detected by the control unit 20 of the hydraulic unit 10, and is converted to a desired deceleration value or desired pressure value. The hydraulic unit 10 takes in the brake fluid from a fluid reservoir 21 and builds up the required brake pressure in the wheel brakes 11, 12, 13, 14 until the actual deceleration corresponds to the desired value or the driver's intent. The amount of the vehicle deceleration can be derived from the signals of the rotational wheel speed sensors 22, 23, 24, 25. As an alternative, the actual deceleration can be detected by means of a longitudinal acceleration sensor (not shown). The occurring wheel brake pressures are either measured directly by means of suitable sensors or are estimated by way of a hydraulic model by means of the control times of the valves installed in the hydraulic unit 10 and the return pump.

The operating device designed according to ergonomic aspects is to be positioned such that it permits an intuitive fatigue-free operation by the driver without requiring the driver to look. Any operation by the driver results in a controlling of the brake lights 17, 18, optionally with the intermediate connection of a separate control unit 16.

The operating device 19 according to the invention is in an operative connection with the accelerator pedal 26, whereby the desired deceleration and the corresponding superimposed hydraulic intervention for operating the brakes will start only when the driver releases the accelerator pedal; that is, when the accelerator pedal is no longer operated and has returned into the initial position. The accelerator pedal position is detected by means of a pedal value generator 27 and the respective signal is emitted to the control unit 20.

The superimposed hydraulic intervention is terminated as soon as the driver operates the accelerator pedal again or as soon as the driver operates the brake pedal. Likewise, the hydraulic intervention is terminated when the operating device 19 is no longer operated.

Figure 2:
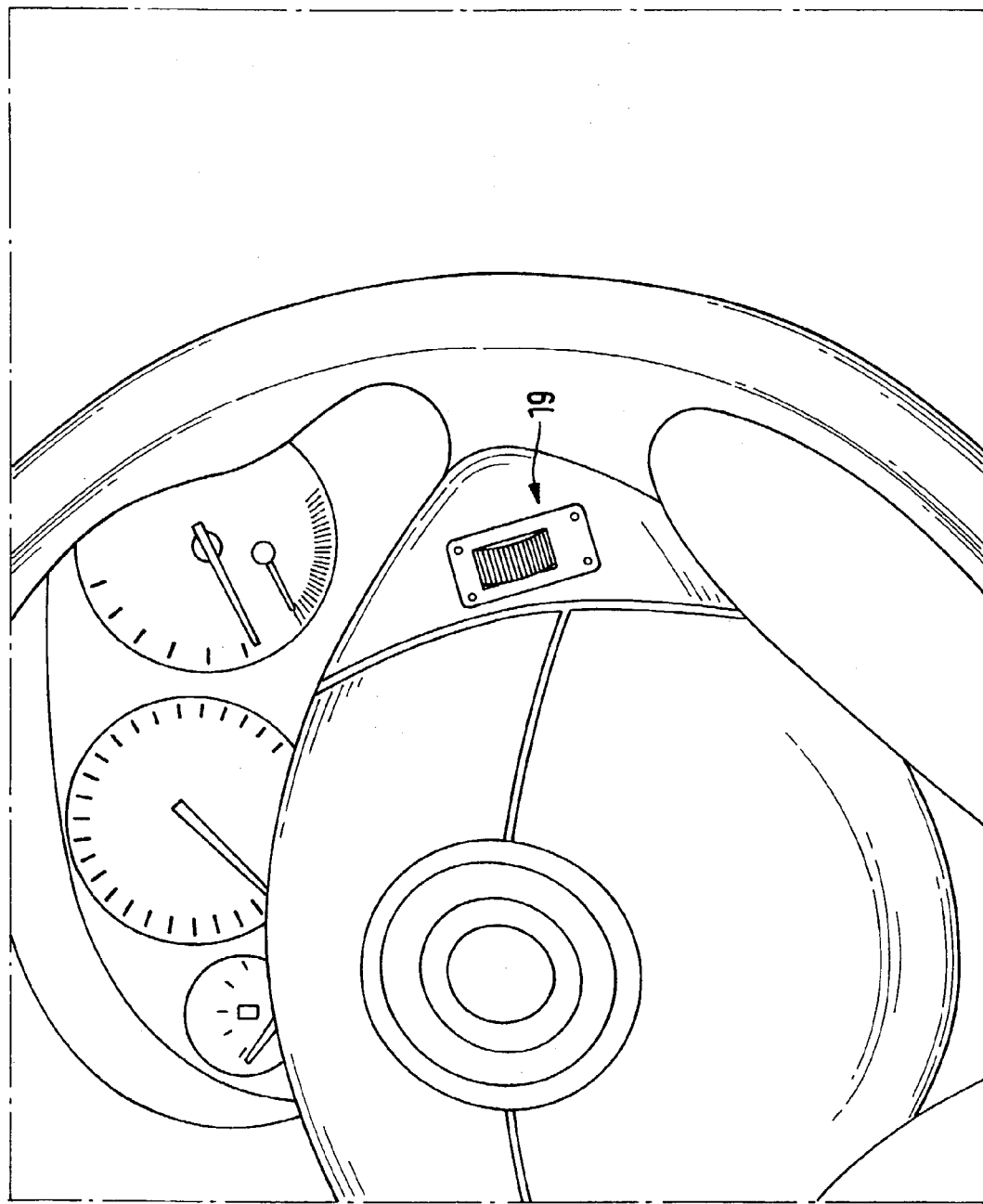
FIG. 2 is a view of an embodiment of the arrangement of an operating device.

FIG. 2 illustrates a preferred embodiment in which the operating device 19 in the form of a knurling wheel is arranged on the vehicle steering wheel such that an operation can be implemented by means of the thumb. This arrangement has the advantage that a reaching-around movement by means of the hand is not necessary, and it can be operated without looking. The knurling wheel has a self-restoring construction, so that as soon as the thumb is removed from the knurling wheel, it automatically moves back and the superimposed hydraulic intervention is terminated.

The self-restoring of the knurling wheel takes place, for example, by way of an integrated spring device, such that when the operating device is operated, a spring tension is built up which moves it back into the initial position when it is released.

Alternatively, the operating device 19 may be in the form of a steering drop arm or in the form of a sensor surface which preferably emits a pressure-dependent signal.

According to one embodiment of the invention, the desired deceleration can be limited to a so-called comfort braking range which is known from ACC systems.

The braking system can be equipped with a pressure-maintaining function when the vehicle is stopped, preferably the deceleration control being changed to a pressure control shortly before the vehicle stoppage. For example, such a changeover may be performed as a function of vehicle speed, and may occur at a set speed less than 15 km/hr. In addition, the wheel brake pressure may be shut in while the vehicle is stopped as long as the operating device is operated. This particularly has the advantage that, in the case of automatic transmission vehicles, the vehicle will not start rolling when the operating device is not yet operated.

In a preferred embodiment of the invention, not only is a constant desired deceleration set by means of the operating device, but also braking takes place as a function of the vehicle speed or lateral acceleration, and the speed at which the operating device is operated, with desired dynamics or a desired progression of the pressure buildup curve.

Furthermore, the arrangement has a learning algorithm which permits a vehicle-adaptive dead-time control and progression.

The invention is particularly useful in combination with a cruise control, the operating device 19 preferably being able to replace the "minus key" present in the case of a cruise control.

According to another preferred embodiment of the invention, in combination with a cruise control and/or an ACC system, the accelerator pedal can be used as a foot support, in which case, when an increased force feedback is exercised, the entire pedal travel is available for the accelerator pedal.

The invention improves driver comfort and the safety and, in particular, permits more relaxed driving in lines of traffic, especially on turnpikes. Driver fatigue is reduced because fewer changes are required between the accelerator pedal and the brake pedal. In addition, it permits an expansion of the cruise control function and the construction of an accelerator pedal as a foot support.

Abbreviations in drawings:

| | |
|---|---|
| AVHL | exhaust valve rear left |
| AVHR | exhaust valve rear right |
| AVVL | exhaust valve front left |
| AVVR | exhaust valve front right |
| DK | damping chamber |
| EVHL | intake valve rear left |
| EVHR | intake valve rear right |
| EVVL | intake valve front left |
| EVVR | intake valve front right |
| HA | rear axle (hydraulic connection) |
| HL | wheel brake rear left |
| HR | wheel brake rear right |
| HSV | high-pressure (resistant) shift valve |
| PD | pulsation damper |
| SK | accumulator chamber |
| sRFP | self-priming return pump |
| USV | change-over valve |
| VA | front axle (hydraulic connection) |
| VL | wheel brake front left |
| VR | wheel brake front right |
| Steuergerät | control unit |

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

The invention claimed is:

1. A braking system for a vehicle having a brake pedal, depression of which generates a corresponding braking effect, said system comprising:
   an operating device for setting a desired deceleration;
   an accelerator pedal;
   a control unit coupled in communication with said operating device and with a sensor for detecting depression and release of said accelerator pedal; wherein,
   in response to a release of the accelerator pedal by a driver, the control unit causes the braking system to brake the vehicle with a deceleration corresponding to the set desired deceleration; and
   said control unit includes means for changing from controlling vehicle deceleration to controlling brake pressure, when vehicle speed falls below a preset value.

2. The braking system according to claim 1, wherein said preset value is 15 km/h.

3. The braking system according to claim 1, further comprising a device for maintaining brake pressure when the vehicle is stopped while the operating unit is actuated.

4. A braking system for a vehicle having a brake pedal, depression of which generates a corresponding braking effect, said system comprising:
   an operating device for setting a desired deceleration;
   an accelerator pedal;
   a control unit coupled in communication with said operating device and with a sensor for detecting depression and release of said accelerator pedal; wherein, when the accelerator pedal is released, the control unit causes the braking system to brake the vehicle with a deceleration corresponding to the set desired deceleration; and said control unit includes a memory for storing at least one buildup curve for controlling a build up of brake pressure in response to a release of said brake pedal, said buildup curve being a function of a vehicle operating parameter, and corresponding to an adjustable desired deceleration.

5. The braking system according to claim 4, wherein the operating device comprises an adjusting wheel, and is arranged at a shifting knob of the vehicle.

6. The braking system according to claim 4, wherein:
the operating device supplies a desired value which the control unit converts to a corresponding desired deceleration by accessing said buildup curve in said memory.

7. The braking system according to claim 4, further comprising:
a device for detecting actual deceleration of the vehicle; and
a comparator which compares the desired deceleration with the actual deceleration and, as a function of the result of the comparison, readjusts the brake pressure.

8. The braking system according to claim 4, further comprising brake lights which are controlled either directly or via a second control unit when the operating device is operated.

9. The braking system according to claim 4, further comprising a device for limiting a setting range for the desired deceleration.

10. The braking system according to claim 4, wherein the vehicle operating parameter comprises one of vehicle speed, vehicle lateral acceleration and a speed at which the operating unit is set.

11. The braking system according to claim 4, wherein said buildup curve for the brake pressure is vehicle specific.

12. The braking system according to claim 4, wherein:
in a settable operating mode, the accelerator pedal has a limited pedal travel and can be used as a foot support; and
the entire pedal travel is available by overcoming a defined force feedback.

13. A method for operating a vehicle brake system having an accelerator pedal, and a brake pedal that can be depressed to generate a corresponding braking effect, said method comprising:
a vehicle driver manipulating an operating device for selecting a desired vehicle deceleration;
in response to a release of the accelerator pedal by said driver, said brake system braking the vehicle with a deceleration corresponding to the desired deceleration; and
changing from controlling vehicle deceleration to controlling brake pressure when vehicle speed falls below a preset value.

14. The method according to claim 13, wherein said preset value is 15 km/h.

15. A method for operating a vehicle brake system having an accelerator pedal, and a brake pedal that can be depressed to generate a corresponding braking effect, said method comprising:
a vehicle driver manipulating an operating device for selecting a desired vehicle deceleration;
in response to a release of the accelerator pedal by said driver, said brake system braking the vehicle with a deceleration corresponding to the desired acceleration; and
controlling a buildup of brake pressure responsive to a release of the brake pedal, according to a pressure buildup curve stored in a memory, said pressure buildup curve corresponding to an adjustable desired deceleration, which is a function of at least one vehicle operating parameter.

* * * * *